United States Patent [19]

Hagen et al.

[11] Patent Number: 5,577,762
[45] Date of Patent: Nov. 26, 1996

[54] ATTACHMENT STRUCTURE FOR USE IN AN INFLATABLE VEHICLE OCCUPANT RESTRAINT SYSTEM

[75] Inventors: George T. Hagen, Troy; Scott A. Kelley, Algonac; Andrew J. Smydra, Rochester, all of Mich.

[73] Assignee: TRW Vehicle Safety Systems Inc., Lyndhurst, Ohio

[21] Appl. No.: 395,924

[22] Filed: Feb. 28, 1995

[51] Int. Cl.⁶ .................................................. B60R 21/16
[52] U.S. Cl. ........................................................ 280/728.2
[58] Field of Search .................................. 280/728.2, 732, 280/737

[56] References Cited

U.S. PATENT DOCUMENTS

| 5,209,519 | 5/1993 | Shiga et al. | 280/728.2 |
| 5,346,248 | 9/1994 | Rhein et al. | 280/732 |
| 5,405,164 | 4/1995 | Paxton et al. | 280/728.2 |
| 5,433,472 | 7/1995 | Green et al. | 280/732 |

FOREIGN PATENT DOCUMENTS

| 5-65048 | 3/1993 | Japan | 280/728.2 |

*Primary Examiner*—Karin L. Tyson
*Attorney, Agent, or Firm*—Tarolli, Sundheim, Covell, Tummino & Szabo

[57] ABSTRACT

An apparatus (10) comprises an inflatable vehicle occupant restraint (12). The apparatus (10) further comprises a structure (30) including (i) opposed first and second walls (31, 32), (ii) opposed third and fourth walls (33, 34) connected to the first and second walls and (iii) a base wall (35) connected to the first, second, third, and fourth walls. The walls (31–35) define a chamber (38). An inflator (20) is located in the chamber (38) and includes a source of inflation fluid for inflating the vehicle occupant restraint (12). The inflator (20) has nozzles (23) at one end adjacent to one of the third and fourth walls (33, 34) for directing inflation fluid from the inflator to the vehicle occupant restraint (12). The structure has a pair of recessed portions (40, 50) for engaging and supporting the inflator (20) in the chamber (38). The recessed portions (40, 50) are spaced apart from the third and fourth walls (33, 34). A member (60) is secured to the recessed portions (40, 50) to secure the inflator (20) in the chamber (38). The nozzles (23) are located in the chamber (38) between the recessed portions (40, 50) and the one of the third and fourth walls (33, 34) when the inflator (20) is secured in the chamber.

12 Claims, 2 Drawing Sheets

ATTACHMENT STRUCTURE FOR USE IN AN INFLATABLE VEHICLE OCCUPANT RESTRAINT SYSTEM

BACKGROUND OF THE INVENTION

1. Technical Field

The present invention relates to an inflatable vehicle occupant restraint system, and particularly relates to an inflatable vehicle occupant restraint system including an air bag reaction canister and an inflator attached to the reaction canister.

2. Background Art

Many different types of inflatable vehicle occupant restraint systems are known. Typically, an inflatable vehicle occupant restraint includes an air bag reaction canister, an inflatable air bag located in a chamber of the reaction canister, and an inflator attached to the reaction canister. When the vehicle experiences deceleration of at least a predetermined threshold, such as occurs in a vehicle collision, the inflator emits gas which is directed into the air bag to inflate the air bag.

SUMMARY OF THE INVENTION

In accordance with the present invention, a vehicle occupant restraint system comprises an inflatable vehicle occupant restraint. The system further comprises a reaction canister structure including (i) opposed first and second walls, (ii) opposed third and fourth walls connected to the first and second walls and (iii) a base wall connected to the first, second, third, and fourth walls. The walls define a chamber in which an inflator is located.

The inflator includes a source of inflation fluid for inflating the vehicle occupant restraint. The inflator has nozzles at one end adjacent to one of the third and fourth walls for directing inflation fluid from the inflator to the vehicle occupant restraint. The reaction canister structure has a pair of recessed portions for engaging and supporting the inflator in the chamber. The recessed portions are spaced apart from the third and fourth walls. Means including a member secured to the recessed portions secures the inflator in the chamber. The nozzles are located in the chamber between the recessed portions and the one of the third and fourth walls when the inflator is secured in the chamber.

Preferably, one of the pair of recessed portions is defined by (i) a first wall portion which extends from the base wall and (ii) a second wall portion which extends between the first wall portion and the first wall. The other one of the pair of recessed portions is defined by (i) a third wall portion which extends from the base wall and (ii) a fourth wall portion which extends between the third wall portion and the second wall. The first and second wall portions extend transverse to each other and (ii) the third and fourth wall portions extend transverse to each other. The recessed portions are located between the third and fourth wall portions. The first wall portion has a surface and the third wall portion has a surface which faces the surface of the first wall portion. The surfaces engage the inflator and the inflator is clamped between the first and third wall portions when the inflator is secured in the chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
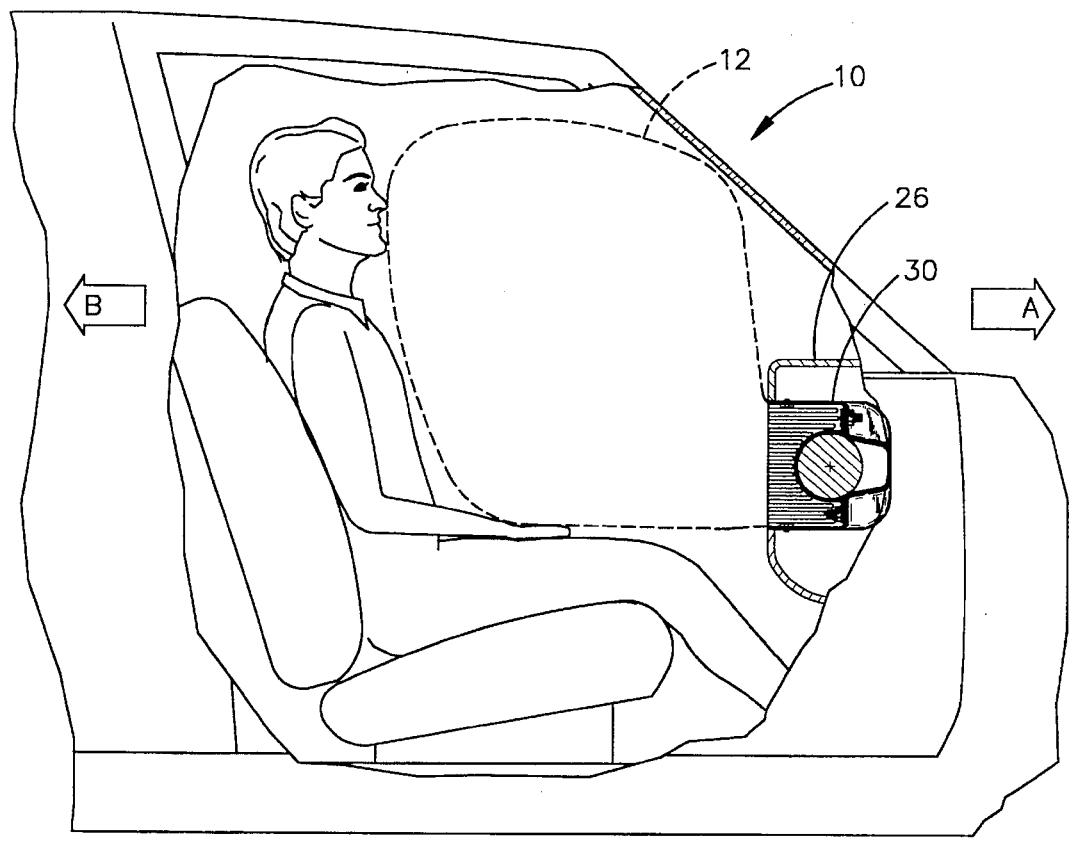
FIG. 1 is a schematic view of an inflatable occupant restraint system embodying an attachment structure constructed in accordance with the present invention.

The present invention is directed to a vehicle occupant restraint system, and particularly to a structure for supporting a source of inflation fluid for inflating an inflatable vehicle occupant restraint. The specific construction of the inflatable vehicle occupant restraint system may vary. By way of example, an inflatable vehicle occupant restraint system 10 embodying a structure for supporting a source of inflation fluid constructed in accordance with the present invention is illustrated in FIG. 1. The vehicle occupant restraint system 10 is in a vehicle which has a forward direction of travel indicated by an arrow A and a rearward direction of travel indicated by an arrow B.

The vehicle occupant restraint system 10 includes an inflatable air bag 12. When the vehicle is involved in a collision, the air bag 12 is expanded from a collapsed condition, illustrated in solid lines in FIG. 1, to an expanded condition, illustrated in dashed lines in FIG. 1, by a rapid flow of fluid from an inflation fluid source, such as an inflator 20. The inflator 20 includes a body portion 21 (FIG. 4) and a neck portion 22 extending away from the body portion 21. The body portion 21 and the neck portion 22 are generally cylindrical in shape, but the body portion 21 has a greater diameter than the neck portion 22. The body portion 21 and the neck portion 22 are coaxial. Nozzles 23 are disposed on the neck portion 22 of the inflator for directing inflation fluid from the inflator 20 into the air bag 12.

When the air bag 12 is in the expanded condition, it restrains movement of an occupant of the vehicle and prevents the occupant from violently striking parts of the vehicle interior during a collision. The air bag 12 then quickly collapses so that the occupant is free to exit from the vehicle. To permit the air bag 12 to collapse, the air bag 12 may be formed of a porous material or may have vents (not shown) which enable the inflation fluid to flow out of the air bag 12.

Although the air bag 12 could be mounted on many different parts of the vehicle, it is illustrated in FIG. 1 as mounted in a dashboard or instrument panel 26 of the vehicle. As illustrated in FIG. 1, the air bag 12 is fixed to a rigid metal reaction canister 30 which is fixed to the dashboard 26. The inflator 20, when actuated, directs a flow of inflation fluid, preferably an inert gas, from the inflator 20 into the air bag 12 to cause the air bag to inflate into the passenger compartment of the vehicle. The inflator 20 is actuated when a vehicle deceleration sensor (not shown) senses the occurrence of a vehicle collision requiring air bag deployment.

Figure 2:
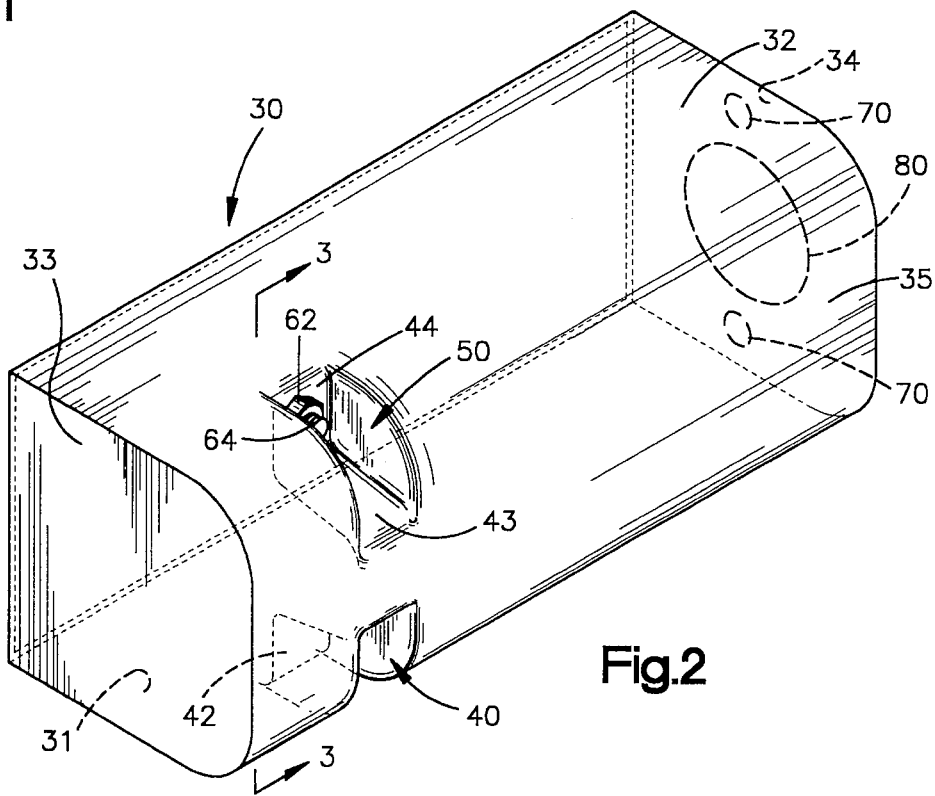
FIG. 2 is a perspective view of an apparatus constructed in accordance with the present invention.
Figure 3:
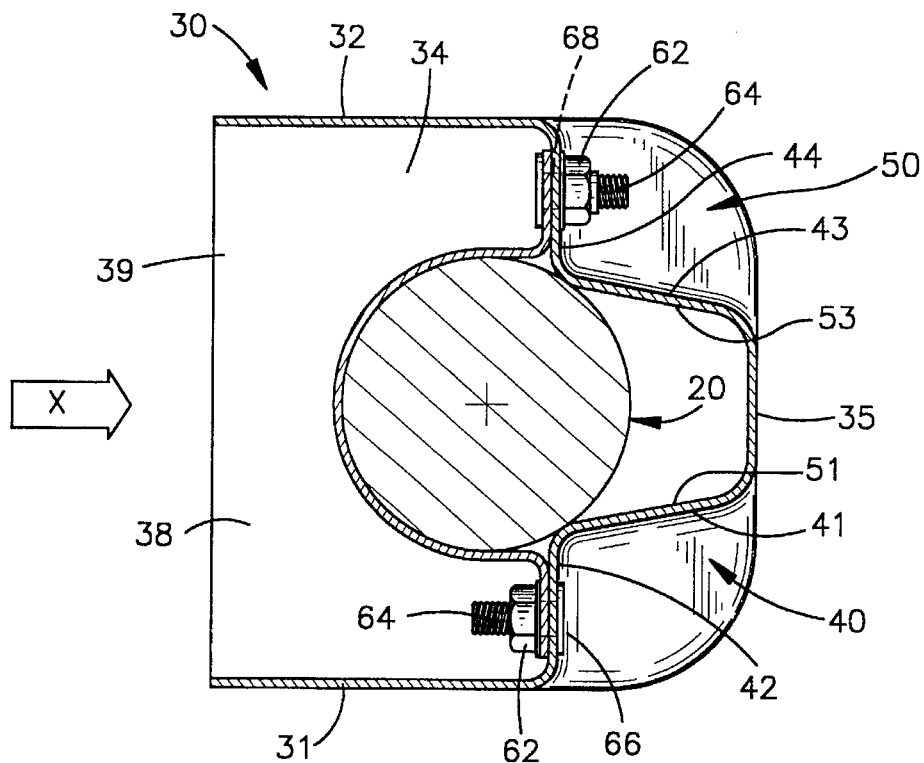
FIG. 3 is a sectional view taken approximately along line 3—3 in FIG. 2.
Figure 4:
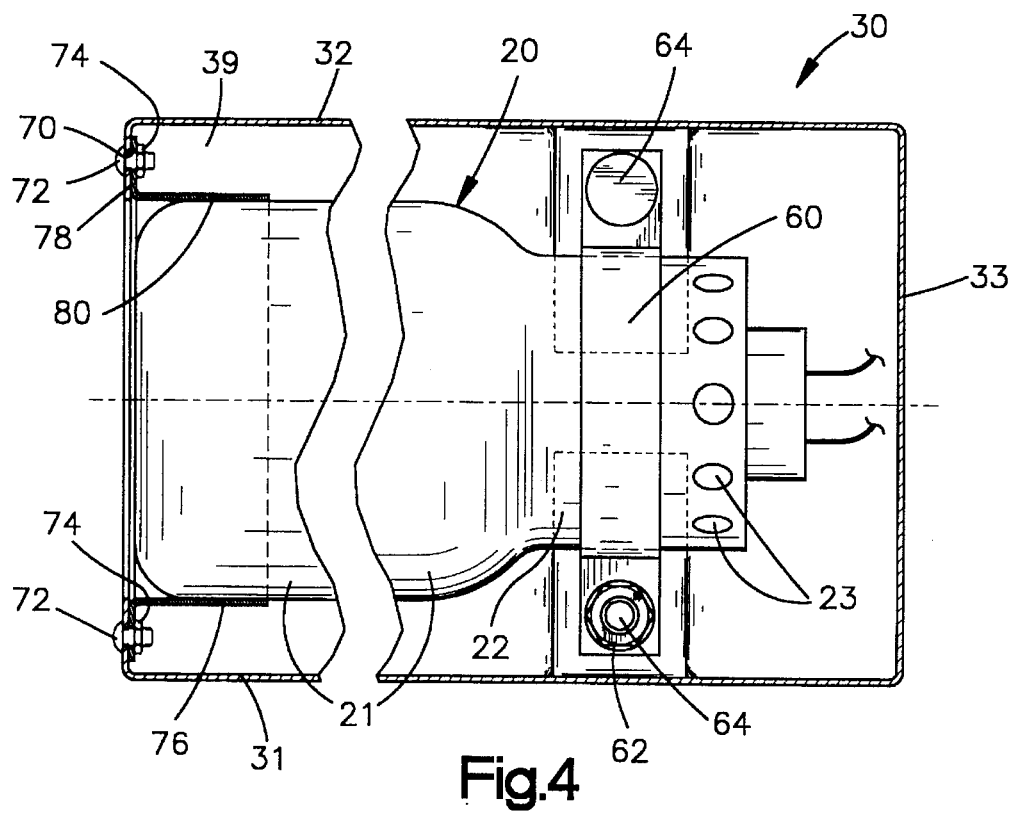
FIG. 4 is a view looking in the direction of arrow X in FIG. 3.

Referring to FIGS. 2–4, the reaction canister 30 includes (i) opposed first and second walls 31, 32, (ii) opposed third and fourth walls 33, 34 connected to the first and second walls 31, 32 and (iii) a base wall 35 connected to the first, second, third, and fourth walls 31, 32, 33, 34. The fourth wall 34 has a relatively large diameter opening 80 and a pair of relatively small diameter openings 70 located on opposite sides of the relatively large diameter opening 80. The walls 31, 32, 33, 34, 35 define a chamber 38 (FIG. 3) with a front opening 39. The inflator 20 is located in the chamber 38. The nozzles 23 of the inflator 20 are at the end of the inflator adjacent to the third wall 33 for directing inflation fluid from the inflator 20 to the interior of the air bag 12.

The reaction canister 30 is, preferably, made of a single continuous piece of deep drawn steel or aluminum, or of cast material. It has a pair of recessed portions 40, 50 for engaging and supporting the inflator 20 in the chamber 38. The recessed portions 40, 50 are spaced apart from the third and fourth walls 33, 34. The nozzles 23 of the inflator 20 are located in the chamber 38 between the recessed portions 40, 50 and the third wall 33 when the inflator 20 is secured in the chamber 38.

The recessed portion 40 is defined by (i) a first wall portion 41 (FIG. 3) which extends from the base wall 35 and (ii) a second wall portion 42 which extends between the first wall portion 41 and the first wall 31. The recessed portion 50 is defined by (i) a third wall portion 43 which extends from the base wall 35 and (ii) a fourth wall portion 44 which extends between the third wall portion 43 and the second wall 32. The second wall portion 42 has a hole 66, and the fourth wall portion 44 has a hole 68.

The first and second wall portions 41, 42 extend transverse to each other. The third and fourth wall portions 43, 44 extend transverse to each other. The second and fourth wall portions 42 and 44 lie in generally the same plane. The first and third wall portions 41, 43 lie in diverging planes and are spaced apart from one another. An interior surface 51 of the first wall portion 41 and the interior surface 53 of the third wall portion 43 are presented toward each other and cooperate to define a cradle for the inflator 20.

To assemble the vehicle occupant restraint system 10, a sleeve 76 (FIG. 4) is inserted through the opening 80 in the side wall 34 of the reaction canister 30. The sleeve 76 defines a central opening and includes an annular, radially extending flange portion 78 having two holes which can be aligned with the two holes 70 in the side wall 34 of the reaction canister 30. The sleeve 76 is manipulated so that the holes in the annular flange portion 78 of the sleeve 76 are aligned with the holes 70 in the side wall 34 of the reaction canister 30. Two bolts 72 are inserted through the two holes in the annular flange portion 78 of the sleeve 76 and the two holes 70 in the side wall 34 of the reaction canister 30. Nuts 74 are screwed onto the bolts 72 to secure the sleeve 76 to the reaction canister 30.

After the sleeve 76 is secured to the reaction canister 30, the neck portion 22 of the inflator 20 is inserted through the opening 80 in the side wall 34 of the reaction canister 30 and the opening in the sleeve 76. The inflator 20 is moved through the opening 80 in the side wall 34 of the reaction canister 30 and the central opening in the sleeve 76 until the end of the body portion 21 which is farthest away from the neck portion 22 of the inflator 20 is received in the sleeve 76 and rests on an inner surface of the sleeve 76 (as best illustrated in FIG. 4). The sleeve 76 restricts lateral movement of the inflator 20 relative to the reaction canister 30.

It is contemplated that the material of the side wall 34 of the reaction canister 30 which defines the opening 80 may be extruded into the chamber 38 to function as a sleeve for supporting the body portion 21 of the inflator 20 in place of the separate sleeve 76. If necessary, a polymeric or elastomeric seal/vibration damper (also not shown) can be added between the sleeve 76 or an extruded sleeve and the body portion 21 of the inflator 20.

A generally arcuate strap member 60 (FIGS. 3 and 4) has a hole in one end which can be aligned with the hole 66 in the second wall portion 42 of the recessed portion 40. The strap member 60 has another hole in its other end which can be aligned with the hole 68 in the fourth wall portion 44 of the recessed portion 50. The strap member 60 is manipulated so that its two holes align with the two holes 66, 68. Two bolts 64 are inserted through the two holes in the strap member 60 and the two holes 66, 68 in the recessed portions 40, 50, respectively. Nuts 62 are screwed onto the bolts 64.

When the nuts 62 are screwed and tightened onto the bolts 64, the strap member 60 presses against the neck portion 22 of the inflator 20. The neck portion 22 of the inflator 20 is thus clamped to the reaction canister 30 by the strap member 60. Because the largest distance between the surfaces 51 and 53 of the first and third wall portions 41 and 43 is less than the outer diameter of the neck portion 22 of the inflator, the neck portion is partially received and clamped between the surfaces 51 and 53. The strap member 60 restricts longitudinal movement, as well as lateral movement, of the inflator 20 relative to the reaction canister 30.

Instead of loading the inflator 20 through a side opening 80 in the reaction canister 30, the inflator 20 could be initially fitted with a support cup at the end of the inflator 20 spaced away from the neck portion 22 of the inflator 20 and loaded through the front opening 39 of the reaction canister 30. The support cup could then be attached to a side wall of the reaction canister 30 using self-tapping screws or threaded nut/bolt fasteners.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An apparatus comprising:

an inflatable vehicle occupant restraint;

a one-piece structure including (i) substantially parallel first and second walls, (ii) substantially parallel third and fourth walls connected to said first and second walls and (iii) a base wall connected substantially perpendicular to said first, second, third, and fourth walls, said walls defining a chamber;

an inflator located in said chamber, said inflator including a source of inflation fluid for inflating said vehicle occupant restraint, said inflator having nozzles at one end adjacent to one of said third and fourth walls for directing inflation fluid from said inflator to said vehicle occupant restraint;

said one-piece structure having a first recessed portion and a second recessed portion for engaging and supporting said inflator in said chamber, said first and Second recessed portions being circumferentially spaced apart at substantially the same axial location between said third and fourth walls;

said first recessed portion being defined by (i) a first wall portion which extends from said base wall and (ii) a second wall portion which extends substantially perpendicularly from said first wall and connects with said first wall portion, said first wall portion having a surface which engages said inflator;

said second recessed portion being defined by (i) a third wall portion which extends from said base wall and (ii) a fourth wall portion which extends substantially perpendicularly from said second wall and connects with said third wall portion, said third wall portion having a surface which faces said surface of said first wall portion and which engages said inflator; and means including a member secured to said first and second recessed portions for securing said inflator in said chamber, said nozzles being located in said chamber between said recessed portions and said one of said third and fourth walls when said inflator is secured in said chamber.

2. An apparatus according to claim 1 wherein (i) said first and second wall portions extend transverse to each other and (ii) said third and fourth wall portions extend transverse to each other.

3. An apparatus according to claim 2 wherein said surface of said first wall portion and said surface of said third wall portion cooperate to engage said inflator and to clamp said inflator between said first and third wall portions when said inflator is secured by said means for securing said inflator in said chamber.

4. A one-piece structure for use in a vehicle occupant restraint system having an inflatable vehicle occupant restraint, said one-piece structure comprising:

substantially parallel first and second walls;

substantially parallel third and fourth walls connected to said first and second walls;

a base wall connected substantially perpendicular to said first, second, third, and fourth walls, said walls defining a chamber;

an inflator located in said chamber, said inflator including a source of inflation fluid for inflating said vehicle occupant restraint, said inflator having nozzles at one end adjacent to one of said third and fourth walls for directing inflation fluid from said inflator to said vehicle occupant restraint;

said one-piece structure having a first recessed portion and a second recessed portion for engaging and supporting said inflator in said chamber, said first and second recessed portions being circumferentially spaced apart at substantially the same axial location between said third and fourth walls;

said first recessed portion being defined by (i) a first wall portion which extends from said base wall and (ii) a second wall portion which extends substantially perpendicularly from said first wall and connects with said first wall portion, said first wall portion having a surface which engages said inflator;

said second recessed portion being defined by (i) a third wall portion which extends from said base wall and (ii) a fourth wall portion which extends substantially perpendicularly from said second wall and connects with said third wall portion, said third wall portion having a surface which faces said surface of said first wall portion and which engages said inflator; and means including a member secured to said first and second recessed portions for securing said inflator in said chamber, said nozzles being located in said chamber between said recessed portions and said one of said third and fourth walls when said inflator is secured in said chamber.

5. A structure according to claim 4 wherein (i) said first and second wall portions extend transverse to each other and (ii) said third and fourth wall portions extend transverse to each other.

6. An apparatus according to claim 5 wherein said surface of said first wall portion and said surface of said third wall portion cooperate to engage said inflator and to clamp said inflator between said first and third wall portions when said inflator is secured by said means for securing said inflator in said chamber.

7. An apparatus according to claim 1 wherein said second and fourth wall portions lie in generally the same plane.

8. An apparatus according to claim 1 wherein said first and third wall portions lie in diverging planes extending from said base wall and are spaced apart from one another.

9. An apparatus according to claim 1 wherein said means including a member secured to said first and second recessed portions for securing said inflator in said chamber comprises a strap which wraps around a portion of said inflator and is fastened to said second and fourth wall portions.

10. An apparatus according to claim 4 wherein said second and fourth wall portions lie in generally the same plane.

11. An apparatus according to claim 4 wherein said first and third wall portions lie in diverging planes extending from said base wall and are spaced apart from one another.

12. An apparatus according to claim 4 wherein said means including a member secured to said first and second recessed portions for securing said inflator in said chamber comprises a strap which wraps around a portion of said inflator and is fastened to said second and fourth wall portions.

* * * * *